United States Patent
Kanemitsu et al.

(10) Patent No.: US 8,792,025 B2
(45) Date of Patent: Jul. 29, 2014

(54) IMAGE PROCESSING APPARATUS, IMAGE PROCESSING METHOD, AND SOLID-STATE IMAGING APPARATUS

(75) Inventors: Shiroshi Kanemitsu, Kanagawa (JP); Tatsuji Ashitani, Kanagawa (JP); Yukiyasu Tatsuzawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 95 days.

(21) Appl. No.: 13/418,511

(22) Filed: Mar. 13, 2012

(65) Prior Publication Data

US 2012/0314107 A1    Dec. 13, 2012

(30) Foreign Application Priority Data

Jun. 7, 2011    (JP) ................................. 2011-127226

(51) Int. Cl.
| | |
|---|---|
| *H04N 9/64* | (2006.01) |
| *H04N 5/217* | (2011.01) |
| *H04N 5/228* | (2006.01) |
| *G06K 9/40* | (2006.01) |

(52) U.S. Cl.
USPC ......... 348/246; 348/241; 348/222.1; 382/274

(58) Field of Classification Search
USPC ....... 348/241–252, E05.079, 222.1; 382/167, 382/274
See application file for complete search history.

(56) References Cited

U.S. PATENT DOCUMENTS

| | | | | |
|---|---|---|---|---|
| 7,265,784 | B1 * | 9/2007 | Frank | 348/241 |
| 2005/0030412 | A1 * | 2/2005 | Nakayama | 348/362 |
| 2007/0222870 | A1 * | 9/2007 | Itoh | 348/243 |
| 2008/0094492 | A1 * | 4/2008 | Rengakuji | 348/246 |
| 2008/0186413 | A1 * | 8/2008 | Someya et al. | 348/739 |
| 2009/0027521 | A1 * | 1/2009 | Fukumoto | 348/241 |
| 2012/0154646 | A1 * | 6/2012 | Sai et al. | 348/246 |

FOREIGN PATENT DOCUMENTS

| | | |
|---|---|---|
| JP | 4-298175 | 10/1992 |
| JP | 2006-311240 A | 11/2006 |
| JP | 2011-071616 A | 4/2011 |

OTHER PUBLICATIONS

Office Action issued May 20, 2014 in Japanese Patent Application No. 2011-127226 file Jun. 7, 2011 (with English Translation).

* cited by examiner

*Primary Examiner* — Nhan T Tran
*Assistant Examiner* — Chan Nguyen
(74) *Attorney, Agent, or Firm* — Oblon, Spivak, McClelland, Maier & Neustadt, L.L.P.

(57) ABSTRACT

According to embodiments, an image processing apparatus includes an image signal holding unit. The image processing apparatus uses an image signal passing through the common image signal holding unit to generate first, second and third correction values. The first correction value is a signal value applied to a pixel in which saturation of an output occurs in a saturation determination. The second correction value is a signal value subjected to a noise cancellation process. The third correction value is a signal value applied to a pixel in which defect occurs in a defect determination.

20 Claims, 8 Drawing Sheets

FIG.3

|  | G | R | G | R | G | ... |
|---|---|---|---|---|---|---|
| 21 | B | G | B | G | B | |
| 22 | G | R | G | R | G | |
| | B | G | B | G | B | |
| 21 | G | R | G | R | G | |
| | B | G | B | G | B | |
| 22 | G | R | G | R | G | |
| | B | G | B | G | B | |

IMAGE PROCESSING APPARATUS, IMAGE PROCESSING METHOD, AND SOLID-STATE IMAGING APPARATUS

CROSS-REFERENCE TO RELATED APPLICATIONS

This application is based upon and claims the benefit of priority from Japanese Patent Application No. 2011-127226, filed on Jun. 7, 2011; the entire contents of all of which are incorporated herein by reference.

FIELD

The present embodiments typically relate to an image processing apparatus, an image processing method, and a solid-state imaging apparatus.

BACKGROUND

Conventionally, a solid-state imaging apparatus capable of realizing a high dynamic range (HDR) by using pixel groups having different optical sensitivities has been proposed. With respect to a part having a small incident light amount, a pixel group having a high optical sensitivity can obtain image information with sharper contrast than a pixel group having a low optical sensitivity. In the pixel group having the high optical sensitivity, if an incident light amount is large, a signal output is saturated with respect to an incident light amount and thus output characteristics may deteriorate. With respect to a part having a large incident light amount, by using an output by a pixel group having a low optical sensitivity, it is possible to ensure image reproducibility. A solid-state imaging apparatus can obtain a HDR image by synthesizing parts having good output characteristics from an image.

The solid-state imaging apparatus multiples a signal value obtained by the pixel group having the low optical sensitivity by predetermined gain, in order to equalize output levels of the pixel group having the high optical sensitivity and the pixel group having the low optical sensitivity. For example, a solid-state imaging apparatus having a complementary metal oxide semiconductor (CMOS) sensor mounted thereon can obtain a configuration for synthesizing HDR images by multiplying a digital type image signal by digital gain by an image processing circuit formed integrally with the CMOS sensor.

For synthesis of the HDR image, the solid-state imaging apparatus requires a line memory for holding an image signal. In addition, the solid-state imaging apparatus may be provided with a line memory for a noise cancellation process of reducing noise such as random noise or defect correction of a damaged part (hereinafter, referred to as defect) of a digital image signal by pixels which do not normally function. In the solid-state imaging apparatus, by increasing necessary line memories, a circuit size increases and cost increases. In the solid-state imaging apparatus, if defect correction or noise cancellation process is reduced in order to reduce a circuit size, a merit such as high quality may be damaged.

With respect to such problems, a configuration for synthesizing HDR images may be mounted in a digital signal processor (DSP) located at a next stage of the solid-state imaging apparatus instead of mounted in the solid-state imaging apparatus. However, in order to cope with HDR, versatility of the DSP deteriorates and system costs increase. Thus, overall costs of a camera module increase.

BRIEF DESCRIPTION OF THE DRAWINGS

FIG. 3 is a diagram describing arrangement of pixels in an image sensor;

DETAILED DESCRIPTION

According to embodiments, an image processing apparatus includes an image signal holding unit, a saturation determining unit, a defect determining unit, a first correction unit, a second correction unit, a third correction unit, a first selection unit, and a second selection unit. The image signal holding unit holds a received image signal using a first pixel group and a second pixel group. The second pixel group is formed of pixels having optical sensitivity for each imaging lower than that of pixels of the first pixel group. The saturation determining unit performs saturation determination for determining whether or not saturation of an output to an incident light amount occurs with respect to the pixels of the first pixel group as a target pixel. A defect determining unit performs defect determination for determining whether or not defect occurs with respect to the pixels of the first pixel group and the pixels of the second pixel group as a target pixel. The first correction unit generates a first correction value. The first correction value is a signal value applied to a pixel in which saturation of an output to an incident light amount occurs in a saturation determination. The second correction unit generates a second correction value with respect to the pixels of the first pixel group and the pixels of the second pixel group. The second correction value is a signal value subjected to a noise cancellation process. The third correction unit generates a third correction value. The third correction value is a signal value applied to a pixel in which defect occurs in a defect determination. The first selection unit selects either of the first correction value and the second correction value according to the result of saturation determination. The second selection unit selects either of the value selected by the first selection unit from between the first correction value and the second correction value and the third correction value according to the result of defect determination. The image processing apparatus uses the image signal passing through the common image signal holding unit to generate the first correction value by the first correction unit, generate the second correction value by the second correction unit and generate the third correction value by the third correction unit.

An image processing apparatus, an image processing method, and a solid-state imaging apparatus according to embodiments will be described in detail with reference to the accompanying drawings. The present invention is not limited to these embodiments.

Figure 1:
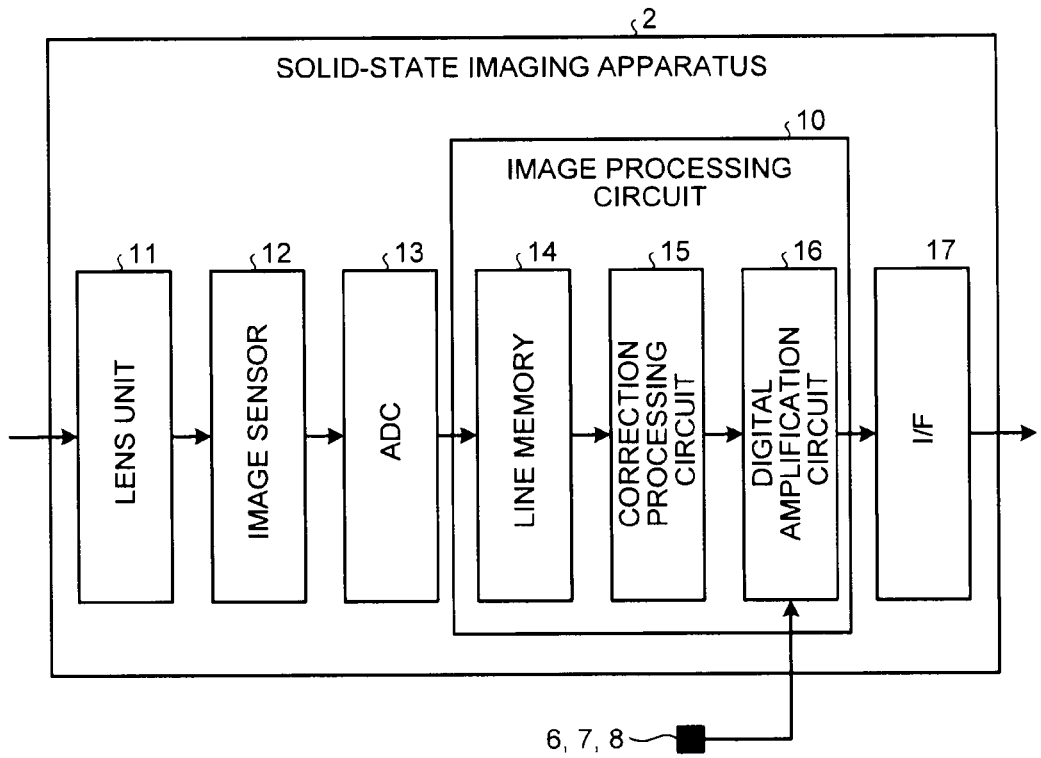
FIG. 1 is a block diagram illustrating a schematic configuration of a solid-state imaging apparatus according to a first embodiment.
Figure 2:
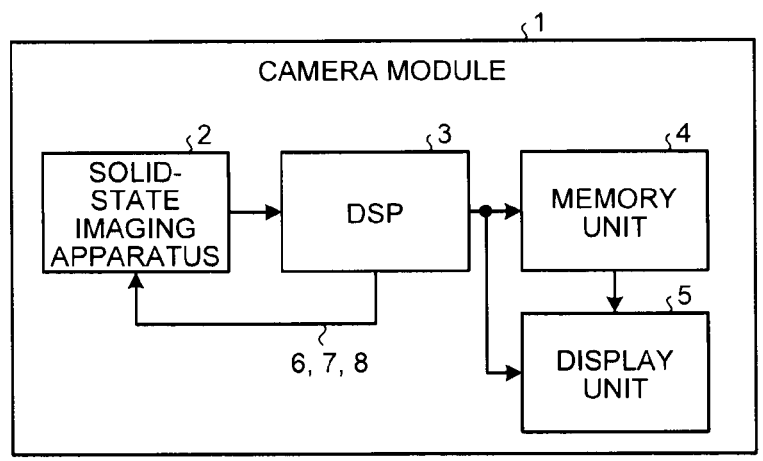
FIG. 2 is a block diagram illustrating the configuration of a camera module including the solid-state imaging apparatus illustrated in FIG. 1.

FIG. 1 is a block diagram illustrating a schematic configuration of a solid-state imaging apparatus according to a first embodiment. FIG. 2 is a block diagram illustrating the configuration of a camera module including the solid-state imaging apparatus illustrated in FIG. 1. A camera module 1 is, for example, a digital camera. The camera module 1 may be an electronic apparatus other than the digital camera, for example, a mobile terminal having a camera attached thereto, or the like.

The camera module 1 includes a solid-state imaging apparatus 2, a digital signal processor (DSP) 3, a memory unit 4, and a display unit 5. The solid-state imaging apparatus 2 images a subject image. The DSP 3 performs signal processing of an image signal captured by the solid-state imaging apparatus 2. The DSP 3 performs shading correction, auto exposure (AE) control, auto white balance (AWB) control, matrix processing, contour enhancement, luminance compression, gamma processing or the like with respect to a RAW image output from the solid-state imaging apparatus 2. The DSP 3 outputs a shading coefficient 6 for shading correction, an AWB coefficient 7 for AWB control, and a digital gain coefficient 8 for AE control to the solid-state imaging apparatus 2.

The memory unit 4 stores an image subjected to signal processing in the DSP 3. The memory unit 4 outputs an image signal to the display unit 5 according to user manipulation or the like. The display unit 5 displays an image according to an image signal received from the DSP 3 or the memory unit 4. The display unit 5 is, for example, a liquid crystal display.

The solid-state imaging apparatus 2 includes an image processing circuit (image processing apparatus) 10, a lens unit 11, an image sensor 12, an analog to digital converter (ADC) 13, and an interface (I/F) 17.

The lens unit 11 receives light from a subject and forms a subject image on the image sensor 12. The image sensor 12 converts the light received from the lens unit 11 into signal charges and forms the subject image. The image sensor 12 receives RGB signal values in order corresponding to a Bayer array and generates an analog image signal.

The ADC 13 converts the image signal from the image sensor 12 from an analog type into a digital type. The image processing circuit 10 performs a variety of image processing with respect to the digital image signal from the ADC 13. The I/F 17 outputs an image signal subjected to signal processing in the image processing circuit 10. The I/F 17 may perform conversion from a serial input into a parallel output or conversion from a parallel input into a serial output.

The image processing circuit 10 includes a line memory 14, a correction processing circuit 15, and a digital amplification circuit 16. The image processing circuit 10 performs signal processing with respect to the subject image received by the image sensor 12. The line memory 14 functions as an image signal holding unit for holding the digital image signal from the ADC 13. The correction processing circuit 15 performs HDR image synthesis, defect correction and noise cancellation processing.

The digital amplification circuit 16 calculates a digital amplification coefficient using the shading coefficient 6, the AWB coefficient 7, and the digital gain coefficient 8 from the DSP 3. In addition, the digital amplification circuit 16 multiplies the image signal from the correction processing circuit 15 by the digital amplification coefficient. In addition, in the camera module 1, in the present embodiment, at least some of processes performed by the DSP 3 may be performed by the image processing circuit 10 of the solid-state imaging apparatus 2.

Figure 3:
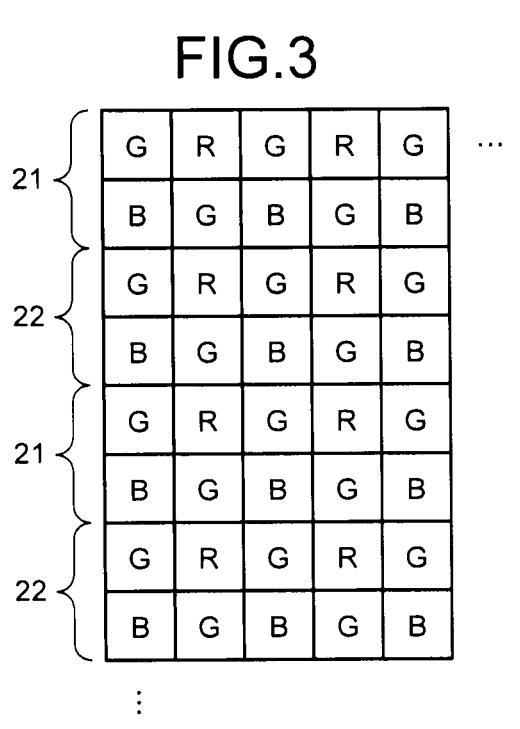

FIG. 3 is a diagram describing arrangement of pixels in an image sensor. In the figure, masses denoted by "R", "G", and "B" indicate an R pixel for detecting R light, a G pixel for detecting G light, and a B pixel for detecting B light. The R pixel, the G pixel, and the B pixel are arranged in the Bayer array in a two-dimensional direction.

The image sensor 12 realizes HDR by making the sensitivity characteristics of pixels of two lines formed of pixels arranged in parallel in a horizontal direction different from each other. The image sensor 12 includes a high-sensitivity pixel group (first pixel group) 21 and a low-sensitivity pixel group (second pixel group) 22. The optical sensitivity of the low-sensitivity pixel group 22 for each imaging is set to be lower than that of the pixels of the high-sensitivity pixel group 21.

In the image sensor 12, the high-sensitivity pixel group 21 formed of two lines and the low-sensitivity pixel group 22 formed of two lines are alternately arranged in a vertical direction. The line memory 14 holds the image signal received using the high-sensitivity pixel group 21 and the low-sensitivity pixel group 22.

In the present embodiment, the pixels of the high-sensitivity pixel group 21 are configured to have optical sensitivity which is, for example, four times the pixels of the low-sensitivity pixel group 22. Here, the image sensor 12 employs the configuration in which a photosensitive time, the area of a light receiving surface, the configuration of focusing lenses arranged on pixels, and optical transmittance of the pixel for each imaging are made different, in order to differentiate the optical sensitivities of the pixels of the high-sensitivity pixel group 21 and the pixels of the low-sensitivity pixel group 22.

Figure 4:
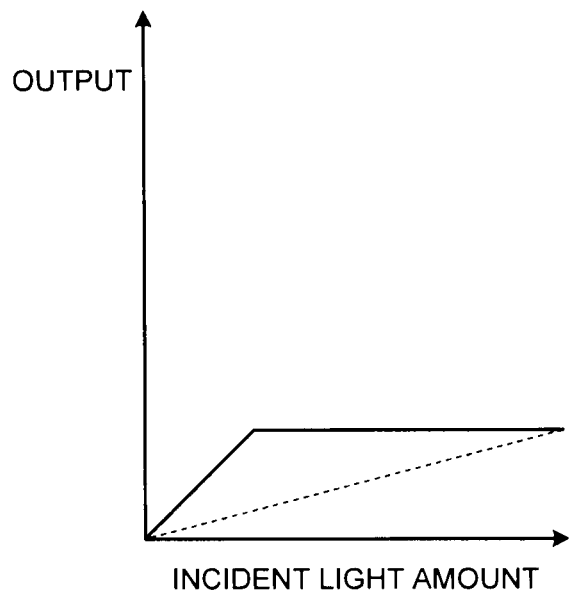
FIG. 4 is a diagram illustrating output characteristics of pixels of a high-sensitivity pixel group and pixels of a low-sensitivity pixel group.

FIG. 4 is a diagram illustrating output characteristics of pixels of a high-sensitivity pixel group and pixels of a low-sensitivity pixel group. In the figure, the output characteristics of the pixels of the high-sensitivity pixel group 21 are illustrated by a solid line and the output characteristics of the pixels of the low-sensitivity pixel group 22 are illustrated by a dotted line. With respect to a part having a small amount of incident light, in the pixels of the high-sensitive pixel group 21, as compared to the pixels of the low-sensitivity pixel group 22, by increasing a ratio of an output to an incident light amount, it is possible to obtain image information with good contrast. In the pixels of the high-sensitivity pixel group 21, a signal output is saturated in the amount of incident light greater than a predetermined amount of incident light and only a constant output can be obtained although the amount of incident light increases. In the pixels of the low-sensitivity pixel group 22, it is possible to obtain an output according to the incident light amount without saturation of the output of the high-sensitivity pixel group 21 under a general illuminance environment.

Figure 5:
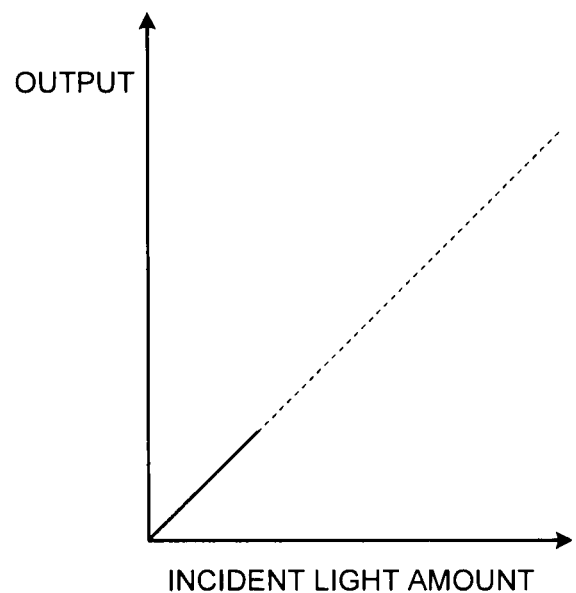
FIG. 5 is a diagram illustrating output characteristics when HDR synthesis is performed from the state illustrated in FIG. 4.

FIG. 5 is a diagram illustrating output characteristics when HDR synthesis is performed from the state illustrated in FIG. 4. The solid-state imaging apparatus 2 synthesizes the output of the high-sensitivity pixel group 21 for the part having a small amount of incident light and the output of the low-sensitivity pixel group 22 for the part having a large amount of incident light, thereby obtaining an HDR image. The output of the low-sensitivity pixel group 22 is synthesized by a multiple of gain, in the present embodiment, four times, according to the output of the high-sensitivity pixel group 21.

Figure 6:
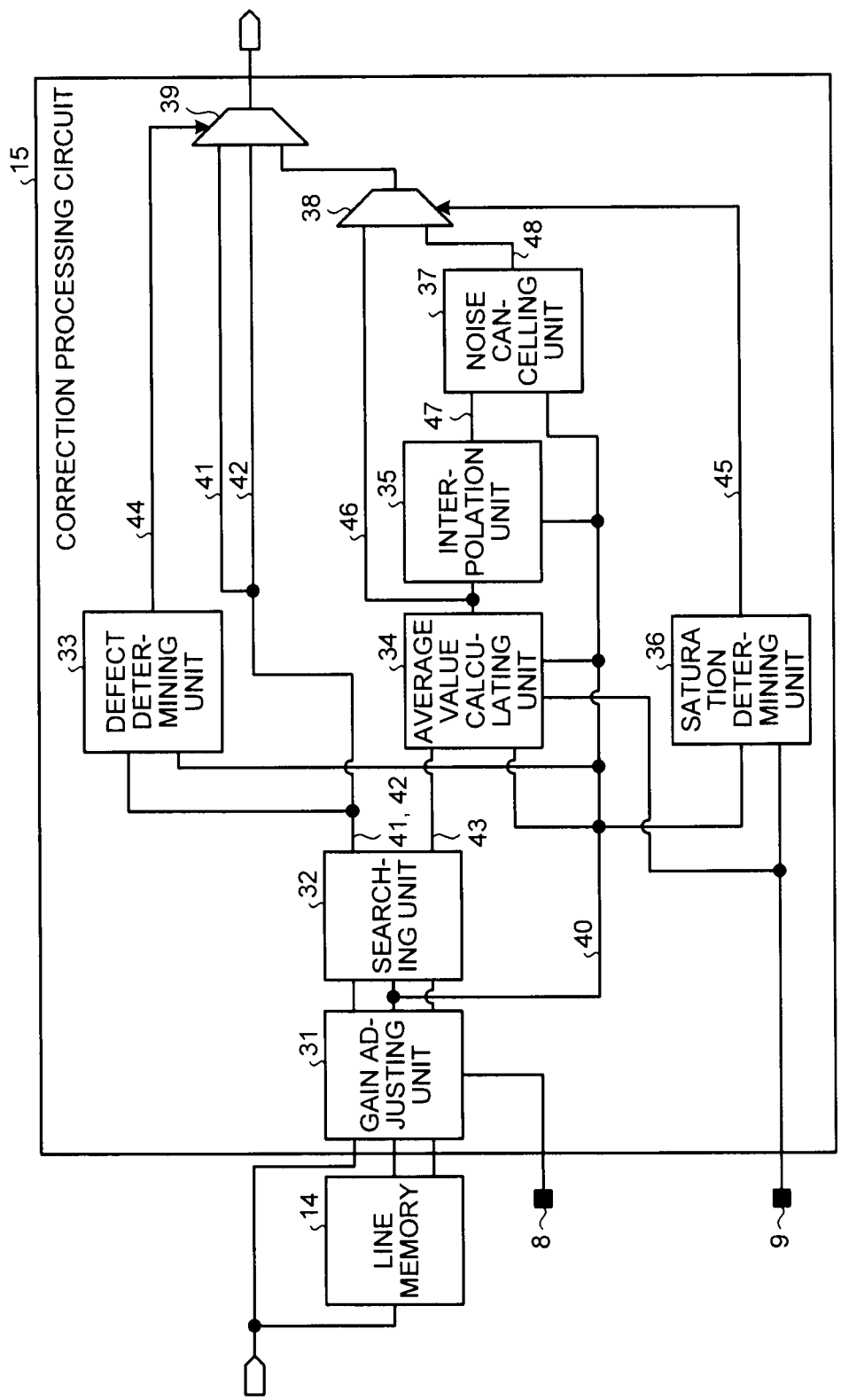
FIG. 6 is a block diagram illustrating the configuration of a correction processing circuit.

FIG. 6 is a block diagram illustrating the configuration of a correction processing circuit. The line memory 14 holds digital image signals of four lines.

Figure 7:
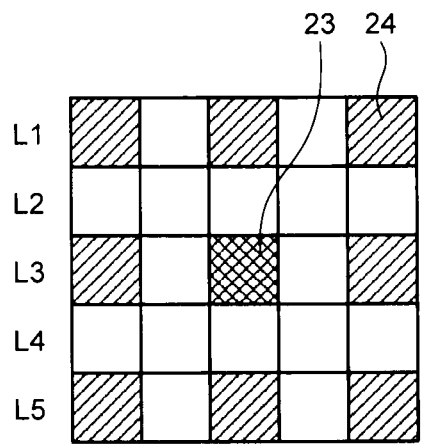
FIG. 7 is a diagram illustrating a target pixel and peripheral pixels.

FIG. 7 is a diagram illustrating a target pixel and a peripheral pixel. The target pixel 23 is a pixel to be corrected by the correction processing circuit 15. The peripheral pixels 24 are pixels having the same color as the target pixel 23. The peripheral pixels 24 are eight pixels located in the vicinity of the target pixel 23 as denoted by oblique lines of the figure.

Three lines L1, L3, and L5 including the target pixel 23 and the peripheral pixels 24 among four lines L2 to L5 held in the line memory 14 and one line L1 just before being input to the line memory 14 are input to the correction processing circuit 15. The target pixel 23 is located at the center of 9 pixels having the same color and including the target pixel 23 and the peripheral pixels 24. In addition, the peripheral pixels 24 are not limited to eight pixels for one target pixel 23 and a plurality of peripheral pixels may be used.

The correction processing circuit 15 includes a gain adjusting unit 31, a searching unit 32, a defect determining unit 33, an average value calculating unit 34, an interpolation unit 35, a saturation determining unit 36, a noise cancelling unit 37, and selectors 38 and 39.

The gain adjusting unit 31 performs gain adjustment by multiplying outputs of pixels of the low-sensitivity pixel group 22 among the three lines L1, L3 and L5 by a digital gain coefficient 8. The searching unit 32 searches for a maximum value 41 and a minimum value 42 of the signal values of the eight peripheral pixels 24 from the image signals passing through the gain adjusting unit 31.

The searching unit 32 generates the maximum value 41 and the minimum value 42 which are third correction values as signal values applied to the target pixel 23 subjected to a defect determination. The searching unit 32 functions as a third correction unit. The searching unit 32 outputs the maximum value 41 and the minimum value 42 of the signal values of the eight peripheral pixels 24 and signal values 43 of six peripheral pixels 24.

The defect determining unit 33 performs a white defect determination as to whether the target pixel 23 is white defect, by comparison between the signal value 40 of the target pixel 23 and the maximum value 41. The signal value 40 is a signal value subjected to gain adjustment in the gain adjusting unit 31 after being read from the line memory 14, if the target pixel 23 is a pixel of the low-sensitivity pixel group 22. In addition, the signal value 40 is a signal value bypassing the gain adjusting unit 31 without being subjected to gain adjustment after being read from the line memory 14, if the target pixel 23 is a pixel of a high-sensitivity pixel group 21.

White defect is defect indicating detection of luminance higher than that of a normal pixel. The defect determining unit 33 determines that the target pixel 23 is white defect, for example, if a value obtained by subtracting the maximum value 41 from the signal value 40 is greater than a predetermined white defect determination threshold. In addition, the white defect determination threshold may be changed according to the digital gain coefficient 8.

In addition, the defect determining unit 33 performs a black defect determination as to whether the target pixel 23 is black defect, by comparison between the signal value 40 and the minimum value 42. Black defect is a defect of detection of luminance lower than that of a normal pixel. The defect determining unit 33 determines that the target pixel 23 is black defect, for example, if a value obtained by subtracting the signal value 40 from the minimum value 42 is greater than a predetermined black defect determination threshold. In addition, the black defect determination threshold may be changed according to the digital gain coefficient 8.

The defect determining unit 33 outputs the result of white defect determination and the result of black defect determination as a defect determination result 44. The defect determining unit 33 performs defect determination even when the target pixel 23 is either a pixel of the first pixel group 21 or a pixel of the second pixel group 22.

The saturation determining unit 36 performs a saturation determination as to whether saturation of an output to the incident light amount occurs in the target pixel 23, for example, by comparison between the signal value 40 of the target pixel 23 and a predetermined saturation determination threshold. The saturation determining unit 36 performs a saturation determination if the target pixel 23 is a pixel of the high-sensitivity pixel group 21. The saturation determining unit 36 outputs a saturation determination result 45.

The saturation determining unit 36 determines whether the target pixel 23 is a pixel of the high-sensitivity pixel group 21, for example, according to a count value 9 of the number of lines in a vertical direction. If the target pixel 23 is a pixel of a low-sensitivity pixel group 22, the saturation determining unit 36 does not perform a saturation determination. The saturation determining unit 36 outputs a signal indicating that the saturation determination is not performed as the saturation determination result 45, if the target pixel 23 is the pixel of the low-sensitivity pixel group 22.

The average value calculating unit 34 calculates an average value 46 of the signal values 43 of the six peripheral pixels 24 excluding the maximum value 41 and the minimum value 42 among the eight peripheral pixels 24. The average value calculating unit 34 generates the average value 46 which is a first correction value as a signal value applied to a pixel subjected to the saturation determination as to whether saturation of the output to the incident light amount occurs by the saturation determining unit 36. The average value calculating unit 34 functions as a first correction unit. In addition, the average value calculating unit 34 performs substitution of the signal values 43 prior to calculation of the average value 46. Substitution of the signal values 43 will be described below.

Figure 8:
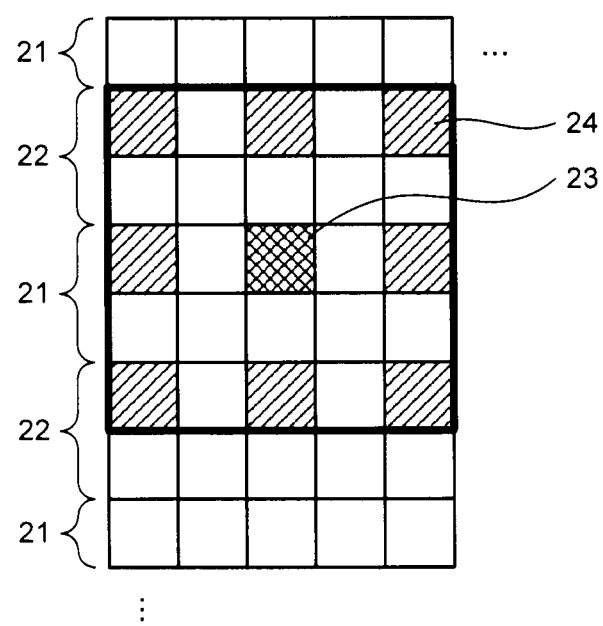
FIGS. 8 and 9 are diagrams illustrating a pattern of the case where a target pixel is included in a high-sensitivity pixel group.
Figure 9:
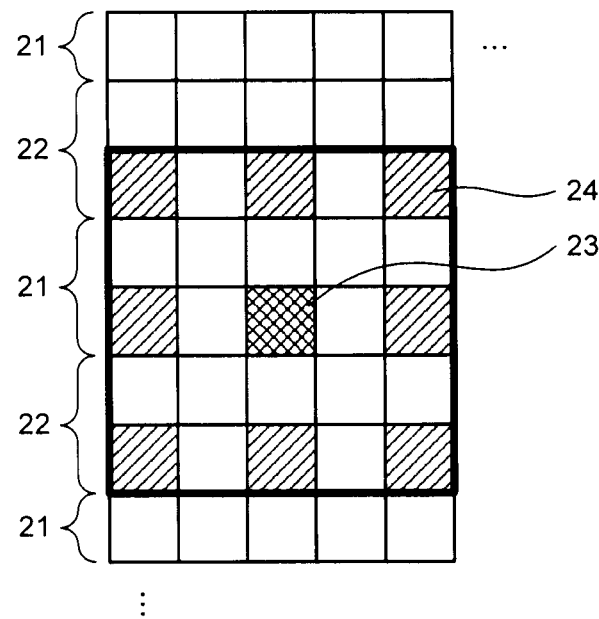

FIGS. 8 and 9 are diagrams illustrating a pattern of the case where a target pixel is included in a high-sensitivity pixel group. FIG. 8 illustrates a state in which the target pixel 23 is included in a line located at an upper side of the figure between two adjacent lines of the high-sensitivity pixel group 21. FIG. 9 illustrates a state in which the target pixel 23 is included in a line located at a lower side of the figure between two adjacent lines of the high-sensitivity pixel group 21. If the target pixel 23 is included in the high-sensitivity pixel group 21, the state may be either the state illustrated in FIG. 8 or the state illustrated in FIG. 9.

Even in either case in which the target pixel 23 is included in the high-sensitivity pixel group 21, all the peripheral pixels 24 are included in the low-sensitivity pixel group 22. In addition, if the target pixel 23 is included in the low-sensitivity pixel group 22, all the peripheral pixels 24 are included in the high-sensitivity pixel group 21. In addition, the average value calculating unit 34 determines whether the target pixel 23 is a pixel of the high-sensitivity pixel group 21 or a pixel of the low-sensitivity pixel group 22, for example, according to the count value 9 switched at timings every two lines of the vertical direction.

If the target pixel 23 is a pixel of the low-sensitivity pixel group 22, saturation of the output to the incident light amount may occur in the peripheral pixels 24 which are the pixels of the high-sensitivity pixel group 21. The average value calculating unit 34 determines whether saturation of the output to the incident light amount occurs in the peripheral pixels 24, for example, by comparison between each of the signal values 43 of the peripheral pixels 24 and the predetermined saturation determination threshold.

The average value calculating unit 34 substitutes the signal values 43 of the peripheral pixels 24 determined to have saturation of the output with the signal value 40 of the target pixel 23 and calculates an average value 46. Thus, the average value calculating unit 34 obtains an average value 46 excluding influence of saturation of the output. The correction processing circuit 15 can perform correction with high accuracy by applying the average value 46 to pixels in which saturation of the output occurs.

In addition, the average value calculating unit 34 may calculate the average value 46 by excluding the signal values 43 of the peripheral signals 24 in which saturation of the output occurs, instead of substitution of the signal values 43 of the peripheral pixels 24, in which saturation of the output occurs, with the signal value 40 of the target pixel 23 and calculation of an average value 46.

If the target pixel 23 is a pixel of the high-sensitivity pixel group 21, saturation of the output to the amount of incident light does not occur in the peripheral pixels 24 which are the pixels of the low-sensitivity pixel group 22 and there is a possibility that white defect occurs. The average value calculating unit 34 determines whether white defect is included in the peripheral pixels 24, for example, by comparison between each of the signal values 43 of the peripheral pixels 24 and the predetermined white defect determination threshold. The average value calculating unit 34 may use the saturation determination threshold for the peripheral pixels 24 as the white defect determination threshold for the peripheral pixels 24.

The average value calculating unit 34 substitutes the signal values 43 of the peripheral pixels 24 determined to have white defect with the signal value 40 of the target pixel 23. Thus, the average value calculating unit 34 obtains the average value 46 excluding influence of white defect. The correction processing circuit 15 can perform a high-accuracy noise cancellation process based on the average value 46.

In addition, the average value calculating unit 34 may calculate the average value 46 by excluding the signal values 43 of the peripheral signals 24 in which white defect occurs, instead of substitution of the signal values 43 of the peripheral pixels 24, in which white defect occurs, with the signal value 40 of the target pixel 23 and calculation of an average value 46.

The interpolation unit 35 mainly functions a fourth correction unit for summing the signal value 40 of the target pixel 23 and the average value 46 with a predetermined ratio in order to interpolate the output for the target pixel 23 which is the pixel of the low-sensitivity pixel group 22. The interpolation unit 35 calculates an interpolation value 47 which is a fourth correction value, for example, by the following Equation 1.

(Interpolation value 47)={3×(signal value 40)+(average value 46)}/4    Equation 1:

With respect to the pixels of the low-sensitivity pixel group 22, since the digital gain coefficient 8 is multiplied in the gain adjusting unit 31, deterioration in a signal-to-noise ratio (SNR) due to influence of quantization noise becomes remarkable as compared to the pixels of the high-sensitivity pixel group 21. The interpolation unit 35 improves the SNR by interpolation of the output for the target pixel 23.

In Equation 1, the interpolation unit 35 sums the signal value 40 and the average value 46 with a ratio of 3:1. This ratio may be appropriately changed. If image resolution is important, the ratio of the signal value 40 is preferably increased and, if the SNR is important, the ratio of the average value 46 is preferably increased.

The noise cancelling unit 37 generates a noise cancellation signal value 48 which is a second correction value as a signal value subjected to a noise cancellation process, with respect to the pixels of the high-sensitivity pixel group 21 and the pixels of the low-sensitivity pixel group 22. The noise cancelling unit 37 functions as a second correction unit.

The noise cancelling unit 37 extracts a difference between the interpolation value 47 which is the computation result of the interpolation unit 35 and the signal value 40 of the target pixel 23. The noise cancelling unit 37 performs amplitude limit for extracting only a signal component having a desired amplitude or less with respect to the extracted signal and obtains a final noise component. The noise cancelling unit 37 subtracts the final noise component from the signal value 40 and obtains a noise cancellation signal value 48. In addition, a variety of parameters of the noise cancellation process of the noise cancelling unit 37, for example, parameters for amplitude limit or the like may be changed according to the digital gain coefficient 8.

The selector 38 selects either the average value 46 which is the first correction value or the noise cancellation signal value 48 which is the second correction value according to the saturation determination result 45 from the saturation determining unit 36. The selector 38 functions as a first selection unit.

The selector 38 outputs the average value 46 (HDR synthesis) if the target pixel 23 is a pixel of the high-sensitivity pixel group 21 and the saturation determination result 45 indicating that saturation of the output to the incident light amount occurs is input. The selector 38 outputs the noise cancellation signal value 48 (noise cancellation) if the target pixel 23 is a pixel of the high-sensitivity pixel group 21 and the saturation determination result 45 indicating that saturation of the output to the incident light amount does not occur is input. The selector 38 outputs the noise cancellation signal value 48 (noise cancellation) if the saturation determination result 45 indicating that the target pixel 23 is a pixel of the low-sensitivity pixel group 22 is input.

The selector 39 selects either the value selected by the selector 38 from between the average value 46 and the noise cancellation signal value 48 or one signal between the maximum value 41 and the minimum value 42 which are the third correction values according to the defect determination result 44 from the defect determining unit 33. The selector 39 functions as a second selector.

The selector 39 outputs the average value 46 or the noise cancellation signal value 48 received from the selector 38 if the defect determination result 44 indicating that neither white defect nor black defect occurs in the target pixel 23 is input. In addition, the selector 39 outputs the maximum value 41 (white defect correction) if the defect determination result 44 indicating that white defect occurs in the target pixel 23 is input. The selector 39 outputs the minimum value 42 (black defect correction) if the defect determination result 44 indicating that black defect occurs in the target pixel 23 is input. The correction processing circuit 15 outputs the signal value selected by the selector 39 as a correction value applied to the target pixel 23.

The image processing circuit 10 applies the average value 46 calculated from the signal values of the pixels of the low-sensitivity pixel group 22 to a part in which saturation of the output to the incident light amount occurs, in the pixels of the high-sensitivity pixel group 21. The solid-state imaging apparatus 2 obtains an HDR image obtained by synthesizing parts having good sensitivity characteristics of the high-sensitivity pixel group 21 and the low-sensitivity pixel group 22. The solid-state imaging apparatus 2 can acquire an image close to a state of viewing a real object with respect to a part, in which so-called halation due to saturation of the output easily occurs, for example, shadow of cloud in a clear sky or the like.

If saturation of the output to the incident light amount occurs in the target pixel 23, saturation of the output to the incident light amount may occur even in the peripheral pixel 24 of the same line as the target pixel 23. In this case, even if white defect occurs in the target pixel 23, it may not be determined that white defect occurs in the target pixel 23, so that the target pixel may be excluded from defect correction. Instead, the average value 46 which is the synthesis result according to HDR synthesis may be applied.

The correction processing circuit 15 uses the image signal passing through the common line memory 14 to generate the average value 46 in the average value calculating unit 34, generate the noise cancellation signal value 48 in the noise cancelling unit 37, and generate the maximum value 41 and the minimum value 42 in the searching unit 32. The image processing circuit 10 can suppress a circuit size as compared to the case in which a separate line memory 14 is mounted per function, by using the configuration in which the common line memory 14 in the defect correction function, the HDR synthesis function, and the noise cancellation function.

The solid-state imaging apparatus 2 can realize both HDR image acquisition and high quality by including the defect correction function and the noise cancellation function along with the HDR synthesis function. The camera module 1 does not need to cope with HDR by the DSP 3 by including the HDR synthesis function in the solid-state imaging apparatus 2. Thus, the camera module 1 can use cheap DSP 3 with high versatility.

Figure 10:
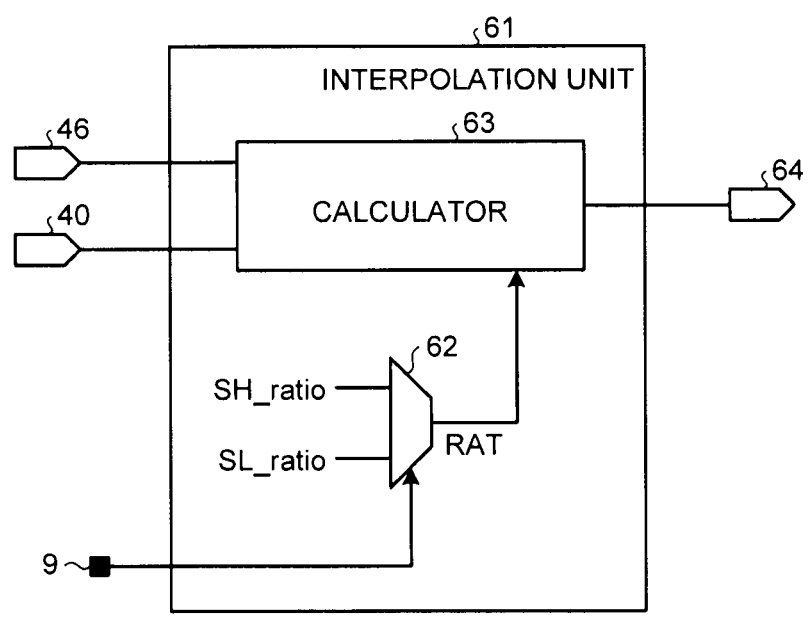
FIG. 10 is a block diagram illustrating the configuration of an interpolation unit applied to a solid-state imaging apparatus according to a second embodiment.

FIG. 10 is a block diagram illustrating an interpolation unit applied to a solid-state imaging apparatus according to a second embodiment. The interpolation unit 61 according to the present embodiment is applied instead of the interpolation unit 35 according to the first embodiment. The same parts as the first embodiment are denoted by the same reference numerals and the redundant description will not be repeated.

The interpolation unit 61 which is a fourth correction unit can change a ratio of the summation of the average value 46 which is the first correction value generated by the average value calculating unit 34 (see FIG. 6) and the signal value 40 of the target pixel 23 (see FIG. 7).

The interpolation unit 61 holds a high-sensitivity ratio SH_ratio applied in the case in which the target pixel 23 is a pixel of the high-sensitivity pixel group 21 and a low-sensitivity ratio SL_ratio applied in the case in which the target pixel 23 is a pixel of the low-sensitivity pixel group 22. Here, SH_ratio and SL_ratio are natural numbers satisfying SH_ratio+SL_ratio=16 and SH_ratio>SL_ratio.

The selector 62 selects and outputs the high-sensitivity ratio SH_ratio as a ratio RAT, when the target pixel 23 is a pixel of the high-sensitivity pixel group 21. In addition, the selector 62 selects and outputs the low-sensitivity ratio SL_ratio as a ratio RAT, when the target pixel 23 is a pixel of the low-sensitivity pixel group 22. The selector 62 determines whether the target pixel 23 is either a pixel of the high-sensitivity pixel group 21 or a pixel of the low-sensitivity pixel group 22 according to the count value 9.

A calculator 63 calculates an interpolation value 64 which is a fourth correction value, for example, by the following Equation 2, using the ratio RAT output from the selector 62. The noise cancelling unit 37 (see FIG. 6) generates a noise cancellation signal value 48 using the interpolation value 64 which is the calculation result by the interpolation unit 61.

$$\text{(Interpolation value 64)}=\{\text{RAT}\times\text{(signal value 40)}+(16-\text{RAT})\times\text{(average value 46)}\}/16 \quad \text{Equation 2:}$$

If the target pixel 23 is a pixel of the high-sensitivity pixel group 21, the interpolation unit 61 calculates the interpolation value 64 in which the ratio of the signal value 40 of the target pixel 23 increases. The correction processing circuit 15 applies the noise cancellation signal value 48 obtained using such an interpolation value 64 to the target pixel 23 if saturation to the incident light amount does not occur. Thus, the image processing circuit 10 can perform the noise cancellation process of emphasizing image resolution with maintaining a high SNR for the high-sensitivity pixel group 21.

If the target pixel 23 is a pixel of the low-sensitivity pixel group 22, the interpolation unit 61 calculates the interpolation value 64 in which the ratio of the average value 46 of the peripheral pixels 24 increases. The correction processing circuit 15 can perform the noise cancellation process of emphasizing SNR improvement, by applying the noise cancellation signal value 48 obtained using such an interpolation value 64 to the target pixel 23 in the case in which the target pixel 23 is a pixel of the low-sensitivity pixel group 22.

The solid-state imaging apparatus 2 can suppress SNR change which may be occur per line even when saturation of the output does not occur or resolution deterioration in the vertical direction by applying the interpolation unit 61 according to the present invention.

In addition, in the present embodiment, SH_ratio+SL_ratio=16 is set and the high-sensitivity ratio SH_ratio and the low-sensitivity ratio SL_ratio may be set in a range satisfying SH_ratio>SL_ratio in 16 steps. Setting of the high-sensitivity ratio SH_ratio and the low-sensitivity ratio SL_ratio is not limited thereto and may be appropriately changed.

Figure 11:
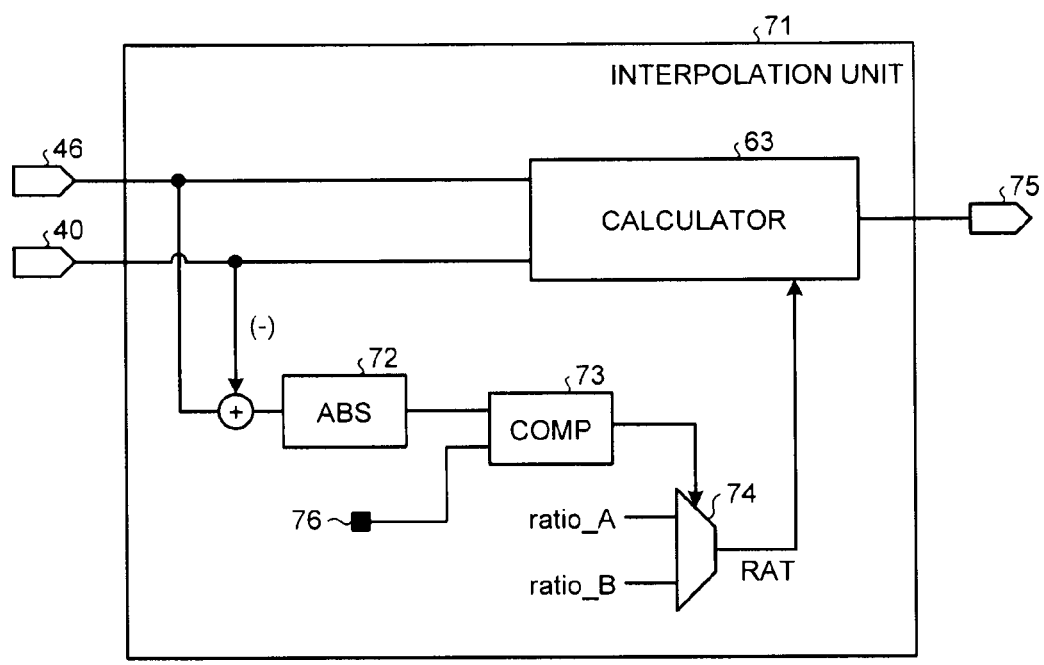
FIG. 11 is a block diagram illustrating the configuration of an interpolation unit applied to a solid-state imaging apparatus according to a third embodiment.

FIG. 11 is a block diagram illustrating an interpolation unit applied to a solid-state imaging apparatus according to a third embodiment. The interpolation unit 71 according to the present embodiment is applied instead of the interpolation unit 35 according to the first embodiment. The same parts as the first embodiment are denoted by the same reference numerals and the redundant description will not be repeated.

The interpolation unit 71 which is a fourth correction unit can change a ratio of the summation of the average value 46 which is the first correction value generated by the average value calculating unit 34 (see FIG. 6) and the signal value 40 of the target pixel 23 (see FIG. 7).

The interpolation unit 71 holds a first ratio ratio_A, a second ratio ratio_B and a difference threshold 76. Here, ratio_A and ratio_B are natural numbers satisfying ratio_A+ratio_B=16 and ratio_A>ratio_B.

An absolute value calculator (ABS) 72 calculates an absolute value of a difference between the average 46 and the signal value 40. A comparator (COMP) 73 compares the absolute value calculated by the ABS 72 with the difference threshold 76. By comparison by the COMP 73, if (the absolute value calculated by the ABS 72)>(the difference threshold 76) is satisfied, the selector 74 selects and outputs the first ratio ratio_A as a ratio RAT. By comparison by the COMP 73, if (the absolute value calculated by the ABS 72)≤(the difference threshold 76) is satisfied, the selector 74 selects and outputs the second ratio ratio_B as a ratio RAT.

The calculator 63 calculates an interpolation value 75 which is a fourth correction value, for example, by the above Equation 2, using the ratio RAT output from the selector 74. The noise cancelling unit 37 (see FIG. 6) generates a noise cancellation signal value 48 using the interpolation value 75 which is the calculation result by the interpolation unit 71.

If the absolute value of the difference between the average value 46 and the signal value 40 is greater than a difference threshold 76, the interpolation unit 71 determines a sharp picture with a large difference in gradation and calculates the interpolation value 75 in which the ratio of the signal value 40 of the target pixel 23 increases. Accordingly, the image processing circuit 10 can perform the noise cancellation process of emphasizing image resolution with respect to the sharp picture.

If the absolute value of the difference between the average value 46 and the signal value 40 is equal to or less than a difference threshold 76, the interpolation unit 71 determines a flat picture with a small difference in gradation and calculates the interpolation value 75 in which the ratio of the average value 46 of the peripheral pixels 24 increases. Accordingly, the image processing circuit 10 can perform the noise cancellation process of emphasizing SNR improvement with respect to the flat picture.

The solid-state imaging apparatus 2 can significantly suppress deterioration in resolution and obtain an image with reduced noise, by applying the interpolation unit 71 of the present embodiment. In addition, setting of the first ratio ratio_A and the second ratio ratio_B is not limited to the case described in the present embodiment and may be appropriately changed. The interpolation unit 71 may select either of the two ratios ratio_A and ratio_B, and also the interpolation unit 71 may select one from among more ratios.

Figure 12:
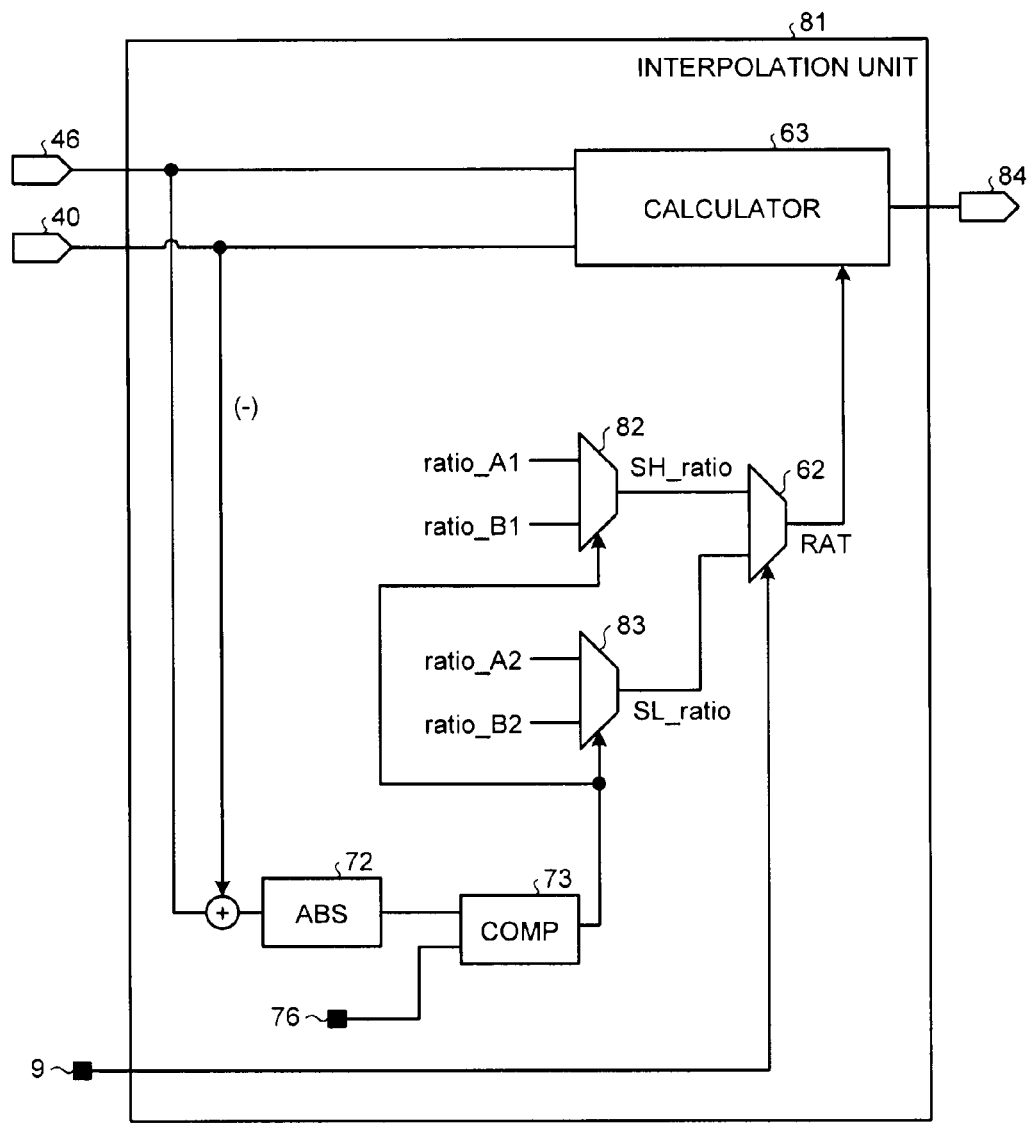
FIG. 12 is a block diagram illustrating the configuration of an interpolation unit applied to a solid-state imaging apparatus according to a fourth embodiment.

FIG. 12 is a block diagram illustrating an interpolation unit applied to a solid-state imaging apparatus according to a fourth embodiment. The interpolation unit 81 according to the present embodiment is applied instead of the interpolation unit 35 according to the first embodiment. The same parts as the first embodiment are denoted by the same reference numerals and the redundant description will not be repeated.

The interpolation unit 81 which is a fourth correction unit combines an element of the interpolation unit 61 (see FIG. 10) according to the second embodiment and an element of the interpolation unit 71 (see FIG. 11) according to the third embodiment. The interpolation unit 81 holds a first high-sensitivity ratio ratio_A1, a second high-sensitivity ratio ratio_B1, a first low-sensitivity ratio ratio_A2, a second low-sensitivity ratio ratio_B2 and a difference threshold 76.

Here, ratio_A1 and ratio_B1 are natural numbers satisfying ratio_A1+ratio_B1=16 and ratio_A1>ratio_B1. ratio_A2 and ratio_B2 are natural numbers satisfying ratio_A2+ratio_B2=16 and ratio_A2>ratio_B2. In addition, ratio_A1≥ratio_A2 and ratio_B1≥ratio_B2 are satisfied.

By comparison by the COMP 73, if (the absolute value calculated by the ABS 72)>(the difference threshold 76) is satisfied, the selector 82 selects and outputs the first high-sensitivity ratio ratio_A1 as a high-sensitivity ratio SH_ratio. In addition, if (the absolute value calculated by the ABS 72)>(the difference threshold 76) is satisfied, the selector 83 selects and outputs the first low-sensitivity ratio ratio_A2 as a low-sensitivity ratio SL_ratio.

By comparison by the COMP 73, if (the absolute value calculated by the ABS 72)≤(the difference threshold 76) is satisfied, the selector 82 selects and outputs the second high-sensitivity ratio ratio_B1 as a high-sensitivity ratio SH_ratio. In addition, if (the absolute value calculated by the ABS 72)≤(the difference threshold 76) is satisfied, the selector 83 selects and outputs the second low-sensitivity ratio ratio_B2 as a low-sensitivity ratio SL_ratio.

The selector 62 selects and outputs the high-sensitivity ratio SH_ratio as a ratio RAT, when the target pixel 23 is a pixel of the high-sensitivity pixel group 21. In addition, the selector 62 selects and outputs the low-sensitivity ratio SL_ratio as a ratio RAT, when the target pixel 23 is a pixel of the low-sensitivity pixel group 22. The selector 62 determines whether the target pixel 23 is either a pixel of the high-sensitivity pixel group 21 or a pixel of the low-sensitivity pixel group 22 according to the count value 9.

The calculator 63 calculates an interpolation value 84 which is a fourth correction value, for example, by the above Equation 2, using the ratio RAT output from the selector 62. The noise cancelling unit 37 (see FIG. 6) generates a noise cancellation signal value 48 using the interpolation value 84 which is the calculation result by the interpolation unit 81.

The solid-state imaging apparatus 2 can significantly suppress deterioration in resolution and obtain an image with reduced noise, according to a difference in gradation by applying the interpolation unit 81 of the present embodiment. The solid-state imaging apparatus 2 can suppress SNR change of each line or resolution deterioration in the vertical direction depending on whether the target pixel 23 is a pixel of the high-sensitivity pixel group 21 or a pixel of the low-sensitivity pixel group 22.

Setting of the first high-sensitivity ratio ratio_A1, the second high-sensitivity ratio ratio_B1, the first low-sensitivity ratio ratio_A2 and the second low-sensitivity ratio ratio_B2 are not limited to the case described in the present embodiment and may be appropriately changed.

The camera module 1 to which the solid-state imaging apparatus 2 according to each embodiment is applied may be an electronic apparatus other than a digital camera, for example, a mobile telephone having a camera attached thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    an image signal holding unit configured to hold an image signal received using a first pixel group and a second pixel group formed of pixels having optical sensitivity for each imaging lower than that of pixels of the first pixel group;
    a saturation determining unit configured to perform saturation determination for determining whether or not saturation of an output to an incident light amount occurs with respect to the pixels of the first pixel group as a target pixel;
    a defect determining unit configured to perform defect determination for determining whether or not defect occurs with respect to the pixels of the first pixel group and the pixels of the second pixel group as a target pixel;
    a first correction unit configured to generate a first correction value as a signal value applied to a pixel in which saturation of the output to the incident light amount occurs in the saturation determination;
    a second correction unit configured to generate a second correction value as a signal value subjected to a noise cancellation process with respect to the pixels of the first pixel group and the pixels of the second pixel group;

a third correction unit configured to generate a third correction value as a signal value applied to a pixel in which defect occurs in the defect determination;

a first selection unit configured to select either of the first correction value and the second correction value according to the result of saturation determination; and a second selection unit configured to select either of the value selected by the first selection unit from between the first correction value and the second correction value and the third correction value according to the result of defect determination, wherein the image signal passing through the common image signal holding unit is used to generate the first correction value by the first correction unit, generate the second correction value by the second correction unit, generate the third correction value by the third correction unit, perform the saturation determination by the saturation determining unit, and perform the defect determination by the defect determining unit.

2. The image processing apparatus according to claim 1, wherein the first selection unit selects the first correction value, if the target pixel is a pixel of the first pixel group and the result of saturation determination indicating that saturation of the output to the incident light amount occurs is input.

3. The image processing apparatus according to claim 1, wherein the first selection unit selects the second correction value, if the target pixel is a pixel of the first pixel group and the result of saturation determination indicating that saturation of the output to the incident light amount does not occur is input.

4. The image processing apparatus according to claim 1, wherein the first selection unit selects the second correction value if the target pixel is a pixel of the second pixel group.

5. The image processing apparatus according to claim 1, wherein the second selection unit selects the value received from the first selection unit between the first correction value and the second correction value, if the result of defect determination indicating that defect does not occur in the target pixel is input.

6. The image processing apparatus according to claim 1, wherein the second selection unit selects the third correction value, if the result of defect determination indicating that defect occurs in the target pixel is input.

7. The image processing apparatus according to claim 1, further comprising a fourth correction unit configured to generate a fourth correction value by summing the first correction value generated by the first correction unit and a signal value of the target pixel which is regarded as a target for generating the first correction value with a predetermined ratio, wherein the second correction unit generates the second correction value using a difference between the fourth correction value and the signal value of the target pixel.

8. The image processing apparatus according to claim 7, wherein the fourth correction unit changes the ratio of the summation of the first correction value and the signal value of the target pixel depending on whether the target pixel is either a pixel of the first pixel group or a pixel of the second pixel group.

9. The image processing apparatus according to claim 8, wherein, as compared to the case in which the target pixel is a pixel of the second pixel group, in the case in which the target pixel is a pixel of the first pixel group, the fourth correction unit increases the ratio of the signal value of the target pixel.

10. The image processing apparatus according to claim 7, wherein the fourth correction unit changes the ratio of summation of the first correction value and the signal value of the target pixel according to a result obtained by comparing a difference between the first correction value and the signal value of the target pixel with a predetermined threshold.

11. The image processing apparatus according to claim 10, wherein, as compared to the case in which an absolute value of the difference between the first correction value and the signal value of the target pixel is less than the threshold, in the case in which the absolute value is greater than the threshold, the fourth correction unit increases the ratio of the signal value of the target pixel.

12. The image processing apparatus according to claim 7, wherein the fourth correction unit changes the ratio of summation of the first correction value and the signal value of the target pixel depending on whether the target pixel is either a pixel of the first pixel group or a pixel of the second pixel group and according to a result obtained by comparing a difference between the first correction value and the signal value of the target pixel with a predetermined threshold.

13. The image processing apparatus according to claim 1, wherein the first correction value outputs an average value calculated from signal values of a plurality of peripheral pixels, which are pixels having the same color as the target pixel regarded as a target for generating the first correction value and are located in the vicinity of the target pixel, as the first correction value, and wherein, if the target pixel is a pixel of the second pixel group, the first correction unit substitutes a signal value of a pixel determined to have saturation of the output among the plurality of peripheral pixels with a signal value of the target pixel and calculates the average value.

14. The image processing apparatus according to claim 1, wherein the first correction value outputs an average value calculated from signal values of a plurality of peripheral pixels, which are pixels having the same color as the target pixel regarded as a target for generating the first correction value and are located in the vicinity of the target pixel, as the first correction value, and wherein, if the target pixel is a pixel of the first pixel group, the first correction unit substitutes a signal value of a pixel determined to have defect among the plurality of peripheral pixels with a signal value of the target pixel and calculates the average value.

15. An image processing method comprising:

holding an image signal received using a first pixel group and a second pixel group formed of pixels having optical sensitivity for each imaging lower than that of pixels of the first pixel group in an image signal holding unit;

performing saturation determination for determining whether or not saturation of an output to an incident light amount occurs with respect to the pixels of the first pixel group as a target pixel;

performing defect determination for determining whether or not defect occurs with respect to the pixels of the first pixel group and the pixels of the second pixel group as a target pixel;

generating a first correction value as a signal value applied to a pixel in which saturation of the output to the incident light amount occurs in the saturation determination;

generating a second correction value as a signal value subjected to a noise cancellation process with respect to the pixels of the first pixel group and the pixels of the second pixel group;

generating a third correction value as a signal value applied to a pixel in which defect occurs in the defect determination;

performing a first selection process of selecting either of the first correction value and the second correction value according to the result of saturation determination; and performing a second selection process of selecting either of the value selected by the first selection unit from between the first correction value and the second correction value and the third correction value according to the result of defect determination, wherein the image signal passing through the common image signal holding unit is used to generate the first correction value, the second correction value and the third correction value, and perform the saturation determination and the defect determination.

16. The image processing method according to claim 15, further comprising generating a fourth correction value by summing the first correction value and a signal value of the target pixel which is regarded as a target for generating the first correction value with a predetermined ratio, wherein the second correction value is generated using a difference between the fourth correction value and the signal value of the target pixel.

17. The image processing method according to claim 16, wherein in the generation of the fourth correction value, the ratio of the summation of the first correction value and the signal value of the target pixel is changed depending on whether the target pixel is either a pixel of the first pixel group or a pixel of the second pixel group.

18. The image processing method according to claim 16, wherein, in the generation of the fourth correction value, the ratio of summation of the first correction value and the signal value of the target pixel is changed according to a result obtained by comparing a difference between the first correction value and the signal value of the target pixel with a predetermined threshold.

19. The image processing method according to claim 15, wherein an average value calculated from signal values of a plurality of peripheral pixels, which are pixels having the same color as the target pixel regarded as a target for generating the first correction value and are located in the vicinity of the target pixel, is output as the first correction value, wherein, in the generation of the first correction value, if the target pixel is a pixel of the second pixel group, a signal value of a pixel determined to have saturation of the output among the plurality of peripheral pixels is substituted with a signal value of the target pixel to calculate the average value, and wherein, in the generation of the first correction value, if the target pixel is a pixel of the first pixel group, a signal value of a pixel determined to have defect among the plurality of peripheral pixels is substituted with a signal value of the target pixel to calculate the average value.

20. A solid-state imaging apparatus comprising:

a lens unit configured to receive light from a subject and form a subject image;

an image sensor configured to capture the subject image; and an image processing apparatus configured to perform signal processing with respect to the subject image received by the image sensor, wherein the image sensor includes a first pixel group and a second pixel group formed of pixels having optical sensitivity for each imaging lower than that of pixels of the first pixel group, and wherein the image processing apparatus includes an image signal holding unit configured to hold an image signal received using the first pixel group and the second pixel group, a saturation determining unit configured to perform saturation determination for determining whether or not saturation of an output to an incident light amount occurs with respect to the pixels of the first pixel group as a target pixel, a defect determining unit configured to perform defect determination for determining whether or not defect occurs with respect to the pixels of the first pixel group and the pixels of the second pixel group as a target pixel, a first correction unit configured to generate a first correction value as a signal value applied to a pixel in which saturation of the output to the incident light amount occurs in the saturation determination, a second correction unit configured to generate a second correction value as a signal value subjected to a noise cancellation process with respect to the pixels of the first pixel group and the pixels of the second pixel group, a third correction unit configured to generate a third correction value as a signal value applied to a pixel in which defect occurs in the defect determination, a first selection unit configured to select either of the first correction value and the second correction value according to the result of saturation determination, and a second selection unit configured to select either of the value selected by the first selection unit from between the first correction value and the second correction value and the third correction value according to the result of defect determination, wherein the image signal passing through the common image signal holding unit is used to generate the first correction value by the first correction unit, generate the second correction value by the second correction unit, generate the third correction value by the third correction unit, perform the saturation determination by the saturation determining unit, and perform the defect determination by the defect determining unit.

* * * * *